(12) United States Patent
Clery

(10) Patent No.: US 6,893,201 B2
(45) Date of Patent: May 17, 2005

(54) HAND CART ASSEMBLY WITH INCREASED CAPACITY AND TILT-MAINTAINING FEATURE

(76) Inventor: John H. Clery, 34 Candlewood Vista, New Milford, CT (US) 06776

( * ) Notice: Subject to any disclaimer, the term of this patent is extended or adjusted under 35 U.S.C. 154(b) by 0 days.

(21) Appl. No.: 10/327,282

(22) Filed: Dec. 20, 2002

(65) Prior Publication Data

US 2004/0131457 A1 Jul. 8, 2004

(51) Int. Cl.[7] ................................................. B60P 1/04
(52) U.S. Cl. ..................... 414/490; 414/444; 414/446; 280/47.34; 280/47.35
(58) Field of Search ................................. 414/490, 444, 414/446; 280/47.34, 47.35, 79.11, 79.3

(56) References Cited

U.S. PATENT DOCUMENTS

| | | | | |
|---|---|---|---|---|
| 1,827,209 A | * | 10/1931 | Robbins | 254/3 C |
| 2,030,925 A | * | 2/1936 | Lea | 254/3 R |
| 2,398,584 A | * | 4/1946 | Goodrich | 254/3 R |
| 2,570,256 A | * | 10/1951 | Lyons | 254/3 R |
| 3,363,787 A | * | 1/1968 | Macomber | 414/444 |
| 4,258,826 A | * | 3/1981 | Murray | 182/20 |
| 4,728,245 A | * | 3/1988 | Shelton | 414/490 |
| 5,277,439 A | * | 1/1994 | Pipes et al. | 280/47.2 |

* cited by examiner

Primary Examiner—Eileen D. Lillis
Assistant Examiner—Michael Lowe

(57) ABSTRACT

An improved wheeled hand cart assembly has a tiltable lifting platform associated with a trailing platform so that separate loads may be transported on each platform. The lifting cart structure comprises a generally conventional L-shaped configuration having a pair of wheels mounted on a common axis, for rolling the lifting cart about. The lifting cart is tiltable about the wheel axis to retain and transport a load. The trailing cart comprises a support platform having a forward end coupled to the lifting cart for pivoting about an axis parallel to the common axis of the wheels, a rearward end portion supported on a caster-like wheel assembly for rolling from place to place in coordination with the spaced-apart wheels and a locking assembly for locking the lifting cart in a tilted position relative to the trailing cart.

9 Claims, 4 Drawing Sheets

HAND CART ASSEMBLY WITH INCREASED CAPACITY AND TILT-MAINTAINING FEATURE

BACKGROUND OF THE INVENTION

1. Field of the Invention

This invention relates to portable hand carts of the type having a lifting platform used for wheeling temporary loads from place to place on the floor/ground. More specifically, the invention relates to improved hand carts of this type having expanded capacity in the form of a trailing platform for transporting additional load material which may be more permanently associated with the cart.

2. Description of the Related Art

Wheeled, portable hand carts of generally L-shaped configuration have been well-known in the art for many years. Such carts conventionally have a pair of axially spaced-apart wheels attached to the body of the cart near the juncture of the long and the short legs of the L-shape.

The shorter leg of the "L" generally serves as a lifting platform that is placed on the ground or floor in horizontal alignment and then slipped under a movable load to lift it above the floor so that both the cart and the load which is cradled in the inner angle of the L-shape, may be wheeled from place to place. The longer leg of the conventional L-shape is substantially vertical when the lifting platform is horizontal, and serves as a lever/handle to facilitate tilting the lifting platform and pushing/steering the cart on its wheels.

However, the known design of such carts tends to restrict them to use with loads that are inherently temporary and that must be removed from the lifting platform to permit transporting of other loads on the same platform. This restriction in the number and size of loads that can be carried by carts of known design is particularly unacceptable for many applications in which a temporary load such as a receptacle drum or container must be used together with an ancillary portable load such as a pump or vacuum or power unit that is preferably associated with the cart on a relatively "constant" basis.

The present invention addresses these considerations by providing a conventional upright wheeled handcart with a trailing platform that is particularly suited to carry a relatively "constant" load along with the cart without interfering with the use of the conventional temporary lifting platform.

SUMMARY OF THE INVENTION

The improved wheeled hand cart assembly of this invention incorporates a tiltable wheeled lifting platform associated with a wheeled trailing platform that in combination permit transporting temporary interchangeable loads on the lifting platform together with other, relatively heavy, "constant" loads on the trailing platform. The cart assembly incorporates a lifting cart structure of generally L-shaped configuration wherein the short leg of the L-shape acts as a lifting platform and the longer leg of the L-shape serves generally as the handle portion of the cart in conventional manner. A pair of axially spaced-apart wheels are rotatably mounted on a substantially common axis on the lifting cart, close to the juncture of the longer leg and the short leg, so that the lifting cart may be rolled from place to place on the floor or ground with a load cradled within the juncture of the longer leg and the short leg.

The improvement of this invention resides in a trailing cart structure comprising a support platform member having a forward end portion coupled to the lifting cart structure for pivoting about an axis substantially parallel to the common axis of the wheels, and a rearward end portion supported on one or more swivel-caster-like wheel assemblies for rolling from place to place in coordination with the spaced-apart wheels. These and other and further features and advantages of this invention will be made more apparent to those having skill in this art, by reference to the following specification considered in conjunction with the accompanying drawings, in which:

DETAILED DESCRIPTION OF THE PREFERRED EMBODIMENT

Figure 1:
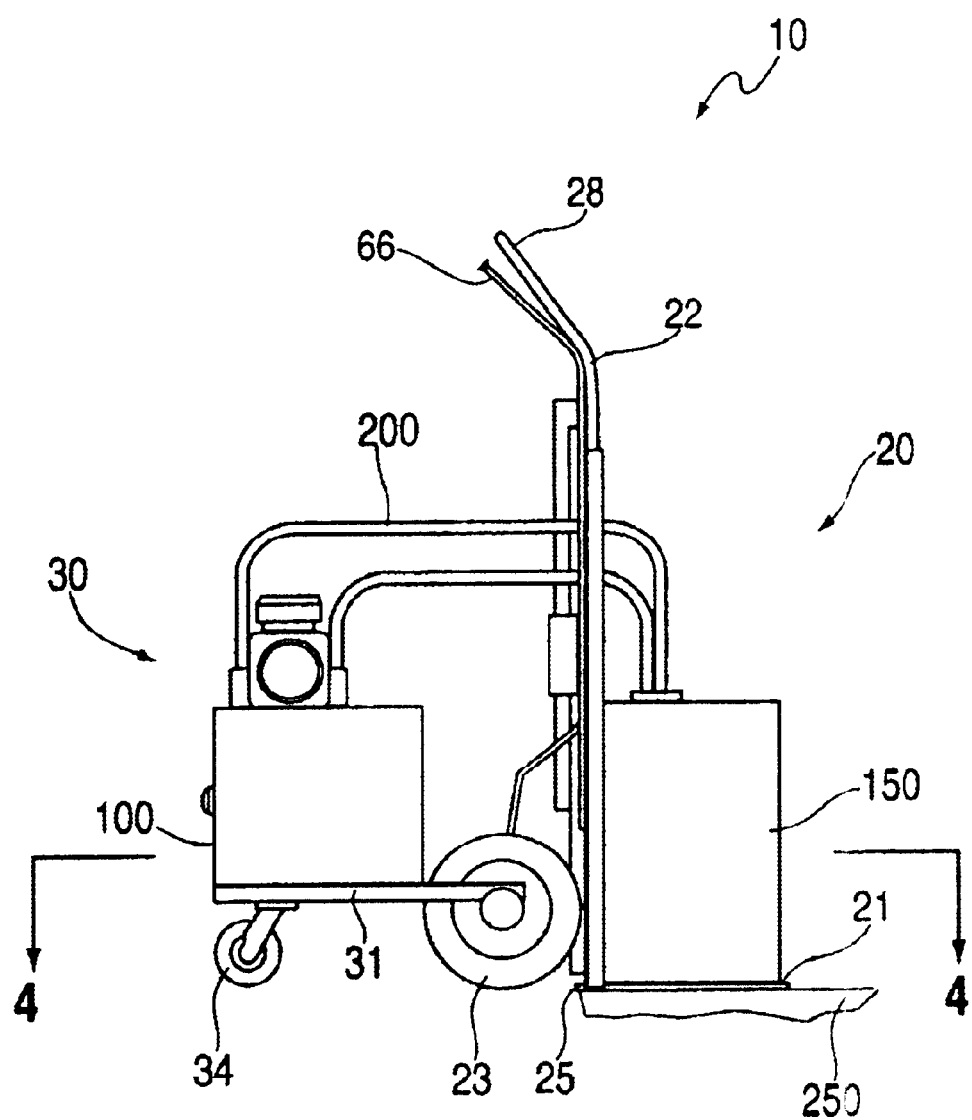
FIG. 1 is a side elevation view of an improved hand cart assembly in accordance with this invention, shown in its at rest position, bearing two separate loads
Figure 2:
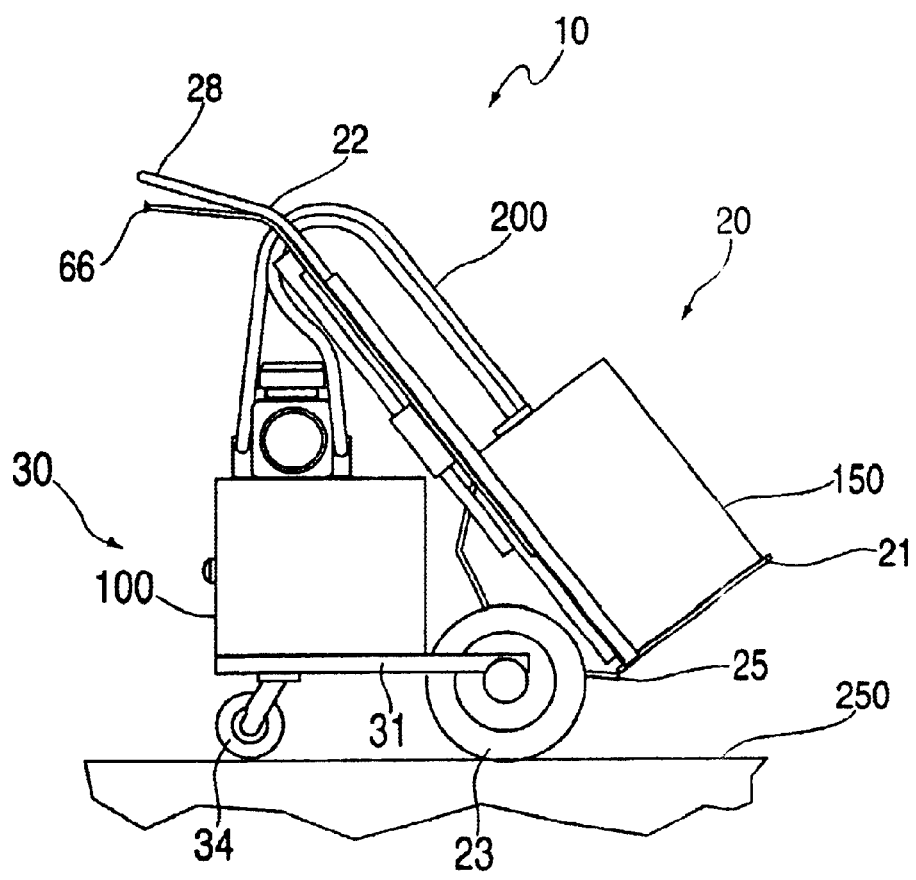
FIG. 2 is a side elevation view of the improved hand cart assembly of FIG. 1, shown in normal position for transporting its loads.

Referring now to FIGS. 1 and 2 of the drawings, the improved hand cart assembly 10 of this invention may be seen to comprise a substantially conventional L-shaped upright lifting cart structure 20 coupled to a generally horizontal trailing cart structure 30. A substantially "constant" or auxiliary load element 100 is shown mounted on trailing cart 30, while a removable, "temporary" load element 150 is shown positioned on lifting cart 20. Constant load 100 may be, for example, a pump or a filtration unit that is required to be transported, regularly, from place to place for use where liquids, for example, are being withdrawn and/or filtered at one location for transport to another in a container such as transient load element 150. In this regard, it will be understood that the pump unit represented by load element 100 will be connected to a source of liquid [not shown] by an inlet hose or pipe [not shown], while the container represented by load element 150 will be connected while on the cart assembly to load element 100 by suitable connecting elements such as conduits 200 of any acceptable form. Aside from being shown to illustrate their relative positions and use in connection with this invention, elements 100, 150 and conduits 200 form no part of this invention.

Lifting cart structure 20 may be seen to include a lifting platform 21 which corresponds to the shorter leg of the L-shape, and a lever/handle portion 22 corresponding generally to the longer leg of the L-shape. Conventional hand grips 28 are provided at the uppermost ends of handles 22 to facilitate manual handling of the cart assembly. A pair of axially spaced-apart wheels 23 are mounted for rotation at opposite ends of an axle 24 which is coupled to lifting cart structure 20 close to the generally right-angle juncture 25 of the lifting platform 21 and the lever/handle 22. In a conventional manner, lifting platform 21 is used by placing it flat on the floor or ground 250 on which a temporary load element 150 is supported, and then slipping it under the load element between the bottom of the element and the ground. When the load element 150 has been positioned on platform 21, lever/handle 22 is used as a lever to tilt platform 21 to the position shown in FIG. 2, so as to cradle element 150 within the inner right angle formed by the juncture 25 of the lifting platform 21 and the lever handle 22.

Figure 4:
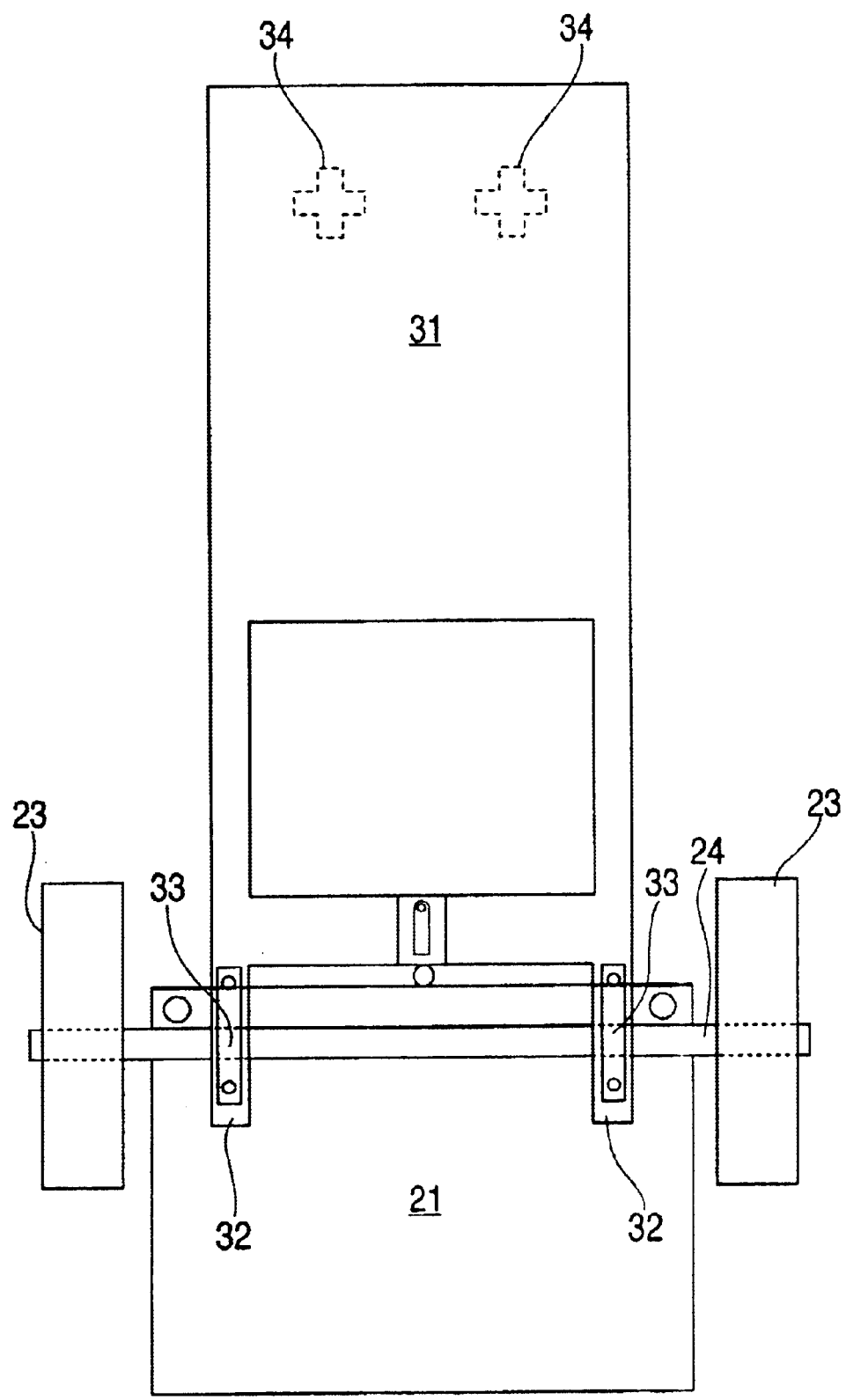
FIG. 4 is section view of the cart of this invention taken through line 4—4 of FIG. 1 with representations of the loads omitted, for clarity.

Trailing cart structure 30 includes a platform surface element 31 having one or more forwardly extending connecting arms 32 [shown more clearly FIG. 4] that terminate in journal bearing sleeves 33 coupled to common axle 24 on lifting art structure 20. Bearings 33 and arms 32 couple trailing cart 30 to lifting cart 20 so that the axial centerline of cart 30 [running from the forward end to the rearward end] is maintained in substantial right angle alignment with the axis of axle 24.

Accordingly, cart assembly 10, although defined by two pivotally connected cart elements 20 and 30, maintains both elements at all times in substantially linear fore and aft alignment so that the cart assembly may be maneuvered readily backward and forward through use of lever handle 22 as a steering means. Although two connecting arms 32 and two spaced apart bearings 33 have been shown for illustrative purposes only, it will be understood readily by those having ordinary skill in the related art, that a single arm and single bearing may be used if desired, to achieve the same coupling function.

The rearward end of trailing cart platform member 31 is supported above the floor 250 by one or more swivel caster wheel assemblies 34, dimensioned to support platform member 31 substantially parallel to floor 250. Most desirably, caster assembly 34 is of the well-known and readily available locking type, to facilitate tilting lifting cart 20 relative to trailing cart 30. That is, when the caster wheel is locked so as to resist rolling of trailer cart 30, the trailing cart will remain substantially stationary so that the handles 22 of the lifting cart may be pulled back to tilt the lifting cart without movement of the trailing cart. In this context, a lockable caster is one having any conventional form of selectively activatable brake mechanism to prevent or substantially resist rotation of the caster wheel about its axis. It should be noted at this point that the horizontal surface of platform 31 may be may be supported at the same height above floor 250 as axle 24, or it may be higher or lower as desired, subject to the choice of any obvious form and shape of the structure attaching platform 31 to coupling sleeves 33, such as arms 32.

While trailing cart element 30 may be seen to remain supported on and substantially parallel to the floor or ground 250 at all times during normal use, it can be seen also that lifting cart 20 may be tilted readily about axle 24 independently of cart element 30 using lever/handle 22, so as to bring cart 20 into a tilted position relative to cart element 30 [as shown in FIG. 2] wherein a load 150 standing on lifting platform 21 will be cradled within the inner right angle formed by the juncture 25 of lifting platform 21 and lever handle 22.

For convenience of use, when lifting cart 20 is locked in the position shown in FIG. 2, the handle grips of handles 22 preferably should lie close to a vertical plane extending vertically upward from the rearmost end of trailing cart 30. This will allow a user to maneuver the cart assembly freely with reduced likelihood that the rearmost end of cart 30 will interfere with the user's feet or legs.

Figure 3:
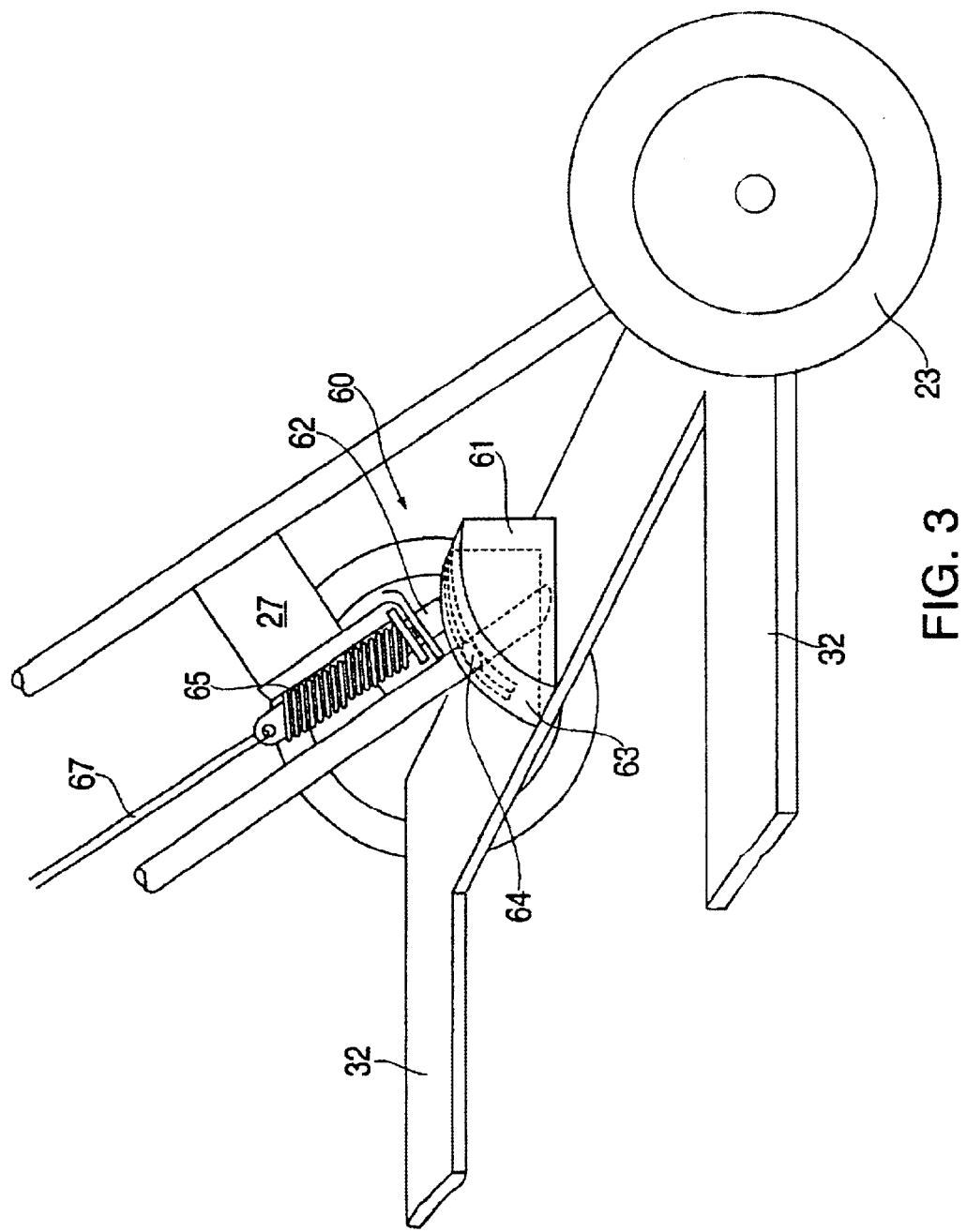
FIG. 3 is a is a partial pictorial representation of the cart assembly of this invention showing the latching mechanism used to maintain the cart in the position shown in FIG. 2.

To facilitate handling and wheeling about of the cart assembly 10 with a load supported on cart element 20, it has been found to be desirable to provide for releasable latching of cart element 20 to cart element 30 in one or more positions. FIG. 3 illustrates a preferred latching mechanism 60 having a first separable latching element 61 mounted on trailing cart structure 30, and a second separable latching element 62 mounted on the lifting cart structure 20. The two latching elements releasably engage each other in one or more positions so as to lock the two cart elements 20, 30 in a desired given position. The two cart elements are latched into the desired position when the lifting cart structure has been tilted about axle 24 so as to bring the first and second latching elements into proper alignment. The first separable latching element 61 may be fixedly attached to trailing cart 30 in any suitable manner, as by bolting it or welding it in place; it includes a curved track surface 63 which is dimensioned to form an arc of a circle having the axis of common axle 24 as its center. One or more holes 64 extend radially inward from track surface 63, defining circumferentially spaced apart stop surfaces, i.e. diametrically opposite interior wall surface portions of holes 64, to engage the end of mating latching element 62 between the surfaces.

Latching element 62 can be seen to be a pin or bolt mounted to slide substantially radially relative to one of the lever handles 22 so as to enter hole 64 telescopically when the first and second latching members 61, 62 have been brought into proper alignment. In this regard, proper alignment is achieved as the result of tilting of cart 20 relative to cart 30. Slidable pin 62 is coupled to the handles 22 of lifting cart 20 by means of a spanning brace 27 extending between the handles. Pin 62 is resiliently biased to enter hole 64 under the resilient force of a compression spring 65 when pin 62 and hole 64 are aligned. However, it will be obvious in view of this disclosure that other forms of biasing may be adopted or may be dispensed with entirely in favor of selective manual engagement of latching pin 62 within latching hole 64.

It will now be understood that latching elements 61, 62 are mounted to cart elements 20, 30 respectively so that the tip of latching rod 62 slides along curved track surface 63, as cart 20 is tilted about axle 24, and that cart 20 then becomes locked to cart 30 in a desired given position when latching member 62 is inserted into latching opening 64 and becomes locked between opposed inner wall surface portions of opening 64. It will be further understood that one or more spaced-apart openings 64 may be provided to allow cart 20 to be latched into one or more tilted positions relative to cart 30.

To allow for release of latching bolt element 62 from engagement with the abutment surfaces of latching opening 64, slidable element 62 includes a manually actuated latch release handle 66 mounted near one of the free ends of lever handle 22. Release handle 64 may be coupled to withdraw latch element 62 from abutment opening 64 in any convenient manner as, for example, by any well-known eccentric linkage coupled to a rod 67 as shown in FIG. 3, or by any other known and available means such as a telescopic cable coupling of the type commonly used for the remote operation of camera shutters.

Although a preferred embodiment of the invention has been illustrated and described, it will be obvious to those having skill in this art that various other forms and embodiments of the invention now may be visualized, readily, by those having skill in this art, without departing substantially from the spirit and scope of the invention set forth in the accompanying claims.

What is claimed is:

1. An improved hand cart assembly comprising:
   a lifting cart structure of generally L-shaped configuration having a lifting platform portion conforming generally to the short leg of said L-shape and a handle portion conforming generally to the longer leg of said L-shape, said short leg and said longer leg defining at their intersection an inner angle portion;

a pair of axially spaced-apart wheels rotatably mounted on a substantially common axis on said lifting cart, proximate the juncture of said longer leg and said short leg, for rolling said cart from place to place;

said lifting platform portion being tiltable about said common axis of said wheels to cradle a load on said lifting cart structure within said inner angle portion of said L-shape;

a trailing cart structure comprising a support platform member having a forward end portion pivotally attached to said lifting cart structure for pivoting about an axis substantially parallel to said common axis of said wheels, and a rearward end portion having at least one swivel-caster-like wheel assembly supporting said rearward end portion for rolling from place to place together with said lifting cart structure;

a releasable latching mechanism having a first separable latching element mounted on said lifting cart structure; and a second separable latching element mounted on said trailing cart structure for releasably latching said first separable latching element in a given position relative to said second separable latching element when said lifting cart structure is tilted about said common axis to bring said first and second latching elements into said given position relative to each other;

said first separable latching element having a manually actuated latch release handle mounted proximate an end of said longer leg of said L-shape of said lifting cart structure remote from said common axis for manually unlatching said latching elements from each other; and said second separable latching element having a curved track surface curving about said common axis and having radially spaced-apart stop surfaces extending from said track surface for latching said second latching element therebetween.

2. The improved hand cart assembly of claim 1, further comprising:

a common axle element defining said common axis and mounted to said lifting cart structure, wherein said axially spaced apart wheels are mounted on said common axle element; and wherein said forward end portion of said trailing cart structure is pivotally coupled to said common axle.

3. The improved hand cart assembly of claim 2, further wherein:

said forward end portion of said trailing cart structure is pivotally coupled to said common axle between said axially spaced-apart wheels.

4. The improved hand cart assembly of claim 1, wherein:

said end of said longer leg of said L-shape of said lifting cart structure remote from said common axis further induces at least a first grip member to facilitate rolling said hand cart assembly from place to place.

5. The improved hand cart assembly of claim 4, wherein:

said latch release handle is positioned in selective manual-gripping relationship to said first grip member.

6. The improved hand cart assembly of claim 5, wherein:

said end of said longer leg of said L-shape lifting cart structure remote from said common axis further comprises a second grip member spaced from said first grip member to further facilitate rolling said hand cart assembly from place to place.

7. The improved hand cart assembly of claim 1, wherein:

said ends of said longer leg of said L-shape of said lifting cart structure remote from said common axis are positioned substantially vertically above said rearward end portion of said trailing cart structure when said first and second separable latching members are engaged in said given position.

8. The improved hand cart assembly of claim 1, wherein:

a pair of spaced-apart swivel-like caster assemblies support said rearward end portion of said trailing cart structure.

9. The improved hand cart assembly of claim 1, wherein:

said swivel-like caster assembly is of the lockable type.

* * * * *